United States Patent
Ryan

(10) Patent No.: US 9,694,837 B2
(45) Date of Patent: Jul. 4, 2017

(54) COLLAPSIBLE REUSABLE CARRYING CASES

(71) Applicant: Gregory Joseph Ryan, Amity Harbor, NY (US)

(72) Inventor: Gregory Joseph Ryan, Amity Harbor, NY (US)

(73) Assignee: AllPillars, Inc., Amity Harbor, NY (US)

(*) Notice: Subject to any disclaimer, the term of this patent is extended or adjusted under 35 U.S.C. 154(b) by 39 days.

(21) Appl. No.: 14/559,588

(22) Filed: Dec. 3, 2014

(65) Prior Publication Data

US 2015/0076799 A1 Mar. 19, 2015

Related U.S. Application Data

(63) Continuation-in-part of application No. 14/488,569, filed on Sep. 17, 2014, now Pat. No. 9,550,602.

(Continued)

(51) Int. Cl.

| | |
|---|---|
| *B62B 3/14* | (2006.01) |
| *B62B 5/04* | (2006.01) |
| *B62B 3/16* | (2006.01) |
| *B62B 3/02* | (2006.01) |
| *B31B 1/26* | (2006.01) |
| *B65D 21/02* | (2006.01) |

(Continued)

(52) U.S. Cl.
CPC ............ *B62B 3/02* (2013.01); *B31B 1/26* (2013.01); *B65D 1/225* (2013.01); *B65D 1/46* (2013.01); *B65D 21/0223* (2013.01); *B65D 43/168* (2013.01); *B65D 25/30* (2013.01); *B65D 2313/00* (2013.01); *B65D 2313/02* (2013.01); *Y02W 30/807* (2015.05)

(58) Field of Classification Search
CPC ............ B65D 11/1813; B65D 11/1833; B65D 11/184; B65D 11/28; B62B 1/006; B62B 3/002; B62B 3/16
See application file for complete search history.

(56) References Cited

U.S. PATENT DOCUMENTS 3,360,180 A * 12/1967 Venturi ................. B65D 1/225
220/6
4,230,227 A * 10/1980 Kowall ................. B65D 5/446
206/600

(Continued)

*Primary Examiner* — J. Allen Shriver, II
*Assistant Examiner* — Travis Coolman
(74) *Attorney, Agent, or Firm* — Alfred M. Walker

(57) ABSTRACT

Collapsible reusable carrying cases are provided in sizes varying from small food containers to large push cart bins on casters. The cases are assembled or disassembled from a joined flat space-saving configuration to a functioning case and vice-versa. All parts that make up a carrying case do not separate from the carrying case and no parts can be removed. The cases are formed from rigid plastic panels, and are assembled or disassembled without tools. The sides of the cases are erected progressively by hand by interlocking elements at the corners. The panels also disassemble progressively by being manually pulled apart. When folded into a flat storage or shipping configuration, the panels stay together, resisting unfolding by virtue of snaps which are either molded into the panels or bonded to them. The carrying cases are resistant to water, dirt, bacteria, molds, allergens, and inclement weather.

10 Claims, 22 Drawing Sheets

Related U.S. Application Data

(60) Provisional application No. 62/007,054, filed on Jun. 3, 2014, provisional application No. 61/871,306, filed on Sep. 18, 2013.

(51) Int. Cl.
  *B65D 1/22* (2006.01)
  *B65D 1/46* (2006.01)
  *B65D 43/16* (2006.01)
  *B65D 25/30* (2006.01)

(56) References Cited

U.S. PATENT DOCUMENTS

| | | | | |
|---|---|---|---|---|
| 4,266,791 A * | 5/1981 | Myers | B62B 1/208 | 280/37 |
| 4,355,781 A * | 10/1982 | Stolpin | A63H 33/04 | 249/184 |
| 4,693,386 A * | 9/1987 | Hughes | B65D 11/1833 | 220/1.5 |
| 4,917,255 A * | 4/1990 | Foy | B65D 25/005 | 206/503 |
| 5,050,793 A * | 9/1991 | Graham, Jr. | B65D 5/4283 | 229/122.3 |
| 5,077,870 A * | 1/1992 | Melbye | A44B 18/0049 | 24/452 |
| 5,454,477 A * | 10/1995 | Bornhorst | A45C 5/02 | 220/23.4 |
| 5,586,372 A * | 12/1996 | Eguchi | A44B 18/0053 | 24/306 |
| 5,632,392 A * | 5/1997 | Oh | B65D 11/1833 | 220/6 |
| 5,634,532 A * | 6/1997 | Bucher | B62B 5/04 | 188/1.12 |
| 5,865,334 A * | 2/1999 | Ruiz | B65D 11/1893 | 206/451 |
| 5,867,876 A * | 2/1999 | Petersen | A44B 18/0053 | 24/442 |
| 5,950,836 A * | 9/1999 | Iwamoto | B65D 81/113 | 206/386 |
| 6,105,980 A * | 8/2000 | Cino | B62B 3/02 | 206/505 |
| 6,293,418 B1 * | 9/2001 | Ogden | B65D 11/1833 | 220/6 |
| 6,349,951 B1 * | 2/2002 | Mogensen | B60B 30/10 | 280/33.998 |
| 6,665,993 B2 * | 12/2003 | Sorensen | A63H 33/062 | 16/224 |
| 6,691,885 B2 * | 2/2004 | Brown | B65D 19/12 | 220/1.5 |
| 6,983,946 B2 * | 1/2006 | Sullivan | B62B 1/002 | 206/511 |
| 7,066,477 B2 * | 6/2006 | Dubois | B62B 3/04 | 280/166 |
| 7,175,040 B2 * | 2/2007 | Lorenz | B65D 11/184 | 220/6 |
| 7,520,390 B2 * | 4/2009 | Sonon | A47F 3/14 | 206/766 |
| 7,530,580 B2 * | 5/2009 | Holgesson | B62B 3/16 | 220/1.5 |
| 7,540,381 B2 * | 6/2009 | Blasco | B65D 25/005 | 206/449 |
| 8,608,050 B2 * | 12/2013 | Seliger | B65D 5/2009 | 229/117.16 |
| 8,740,228 B2 * | 6/2014 | Patterson | B62B 3/16 | 206/503 |
| 9,114,819 B2 * | 8/2015 | Tiilikainen | B62B 3/16 | |
| 9,278,775 B2 * | 3/2016 | Meers | B65D 11/184 | |
| 2005/0006861 A1 * | 1/2005 | Dubois | B62B 3/04 | 280/33.998 |
| 2006/0169690 A1 * | 8/2006 | Rothschild | A45C 7/0036 | 220/7 |

* cited by examiner

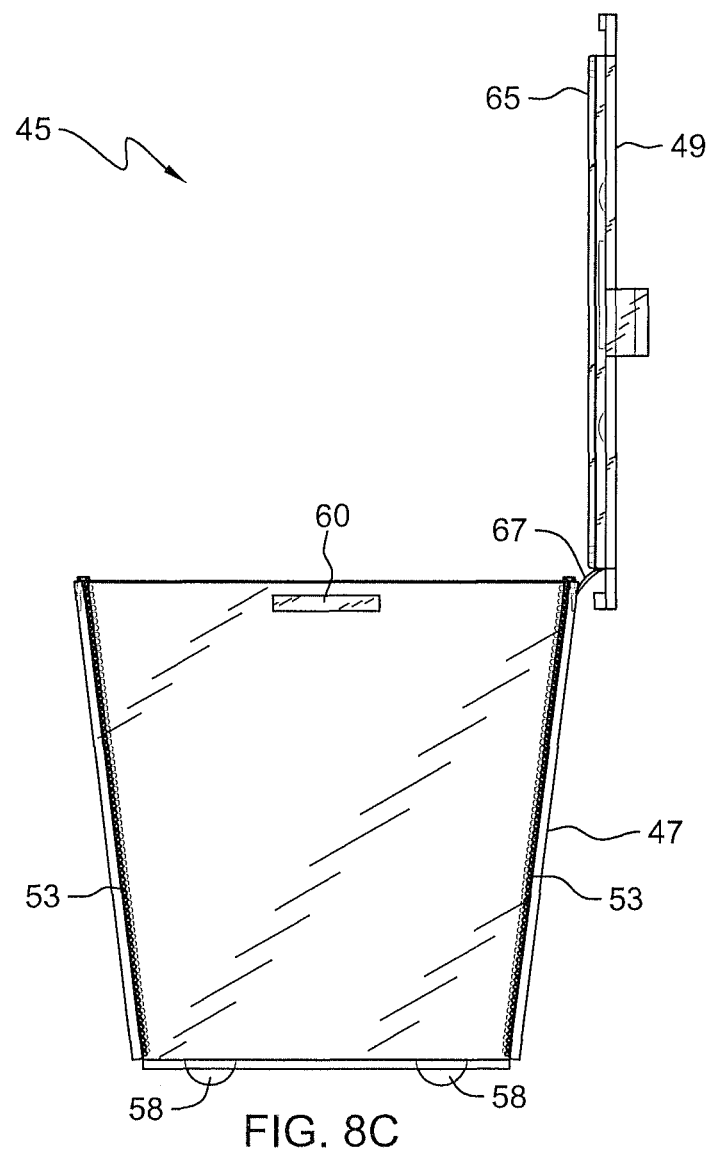

COLLAPSIBLE REUSABLE CARRYING CASES

RELATED APPLICATIONS

This application is a continuation-in-part of application Ser. No. 14/488,569, filed on Sep. 17, 2014, and claims priority under 35 U.S.C. §120 therefrom. The '569 application claims benefit and priority of provisional application Ser. No. 61/871,306 filed Sep. 18, 2013 and provisional application Ser. No. 62/007,054 filed Jun. 3, 2014, under 35 U.S.C. §119(e), which applications are incorporated by reference herein.

FIELD OF THE INVENTION

The present invention relates to collapsible, foldable and/or reusable carrying cases.

BACKGROUND OF THE INVENTION

The prior art reveals many patents describing collapsible, foldable, and/or reusable containers or carrying cases.

U.S. Pat. Nos. 6,293,418, 4,491,231, 4,820,383, 5,450,962, 8,261,923, 7,048,135, and US Patent Application Publication number 2012/0091133, show molded plastic containers or boxes that are assembled or disassembled with the use of a variety of latches and hinges.

U.S. Pat. No. 5,016,753 shows a variable height telescoping packaging system. US Patent Application Publication number 2008/0190923 reads to a foldable container with a rigid base which may include wheels. U.S. Pat. No. 4,503,973 shows a corrugated cardboard box with a rigid base incorporating reinforcing plates with wheels or casters.

U.S. Pat. Nos. 4,804,136, 4,901,911, 5,295,632, 5,913,474, 5,996,885, 6,427,907, 6,460,724, 6,474,541, 6,547,127, 6,564,993, 6,651,875, 6,688,516, and 6,824,042 generally incorporate foldable sections of corrugated cardboard or similar plastic panels with plastic or metal molded reinforcing elements.

OBJECTS OF THE INVENTION

However, the above noted prior art does not reveal collapsible reusable carrying cases of a wide variety of sizes, that can be constructed of molded plastic panels, with integral fittings or of corrugated plastic panels, with attached molded fittings that assemble by progressively engaging the side edges and fold on living hinges integral with the flat sections.

It is therefore an object of the present invention to provide a collapsible, foldable, and/or reusable container/carrying case including:

a substantially rectangular bottom panel;

a pair of upwardly extending end panels connected to the bottom panel at fold lines;

a pair of upwardly extending side panels connected to the bottom panel at fold lines;

a cover panel joined to a top edge of one of these side or end panels at a fold line; the bottom panel, end panels and side panels forming a top opening, and the cover panel swiveling between a position closing the top opening and a position exposing the top opening;

wherein these side and end panels have releasable closure attachments where side edges of the side and end panels meet forming the collapsible carrying case; and whereby the panels open up to form a flat, interconnected assembly for storage and shipping.

It is yet another object of the present invention to provide a method of forming and using a reusable and stackable carrying case including the steps of:

forming the carrying case from a substantially rectangular bottom panel, a pair of upwardly extending end panels connected to the bottom panel at fold lines, a pair of upwardly extending side panels connected to the bottom panel at fold lines, and a cover panel joined to a top edge of one of the side or end panels at a fold line;

folding the end panels and side panels upwardly forming a top opening;

swiveling the cover panel between a position closing the top opening and a position exposing the top opening;

using releasable closure attachments along side edges of adjoining side and end panels for securing corners of the carrying case;

using the carrying case to store or ship contents therein; and after emptying the carrying case, opening the panels open up to form a flat, interconnected assembly for storage and shipping.

Other objects will become apparent from the following description of the present invention.

SUMMARY OF THE INVENTION

The present invention includes several common features used to create collapsible reusable carrying cases in sizes varying from small food containers to large push cart bins on casters. If one is introduced to any one of the sizes of containers or cases of this invention, it would be intuitive to assemble or disassemble any case of another size in the same general fashion, going from a joined flat space-saving configuration to a functioning case and vice-versa.

Although several different embodiments are included in this invention, all of the collapsible reusable carrying cases share these common attributes. All parts that make up a carrying case do not separate from the carrying case. No parts can be removed. Rigid plastic panels are used for constructing the cases; these may vary from synthetic materials, such as polyvinyl chloride to polypropylene or other such thermoplastic resins. No tools are required for assembly or disassembly. The sides of the cases are erected progressively by hand by interlocking elements at the corners. The panels also disassemble progressively by manually pulling apart. When folded into a flat storage or shipping configuration, the panels stay together, resisting unfolding by virtue of snaps which are either molded into the panels or bonded to them. Because of the carrying case material and the way it is constructed, it is resistant to water, dirt, bacteria, molds, allergens, and inclement weather. This extends the life of the product and insures that it can be reused over and over again for a number of years.

The carrying cases of this invention offer low first cost relative to their durability as compared with other alternatives. For example, cardboard cartons may be less expensive but their durability is lacking, while plastic cases as in the prior art often require heavy panels and metal hinges and latches. For businesses that use multiple carrying cases to ship their products, these carrying cases can be labeled with a specific digital bar code to identify the owner. Depending on the size, the customer can mail the carrying case back to the company (perhaps free of charge) after the customer takes his product out of the carrying case. He or she would then be credited for sending it back. Alternatively, he or she can take the empty case back to the store of purchase and get a refund of their deposit. Because these cases do not need to be recycled (like cardboard boxes), they are a Green Friendly Product. After a case of this invention has deteriorated from normal wear and tear after many use cycles, it can be sent back to the manufacturer and refurbished by spraying a coat of the material from which it was made. Plastic or fabric tape can be used to reinforce or rejuvenate fold lines. This process rejuvenates the case to its original serviceable form adding years of service life.

Depending on size, the method of choice to construct these cases is of molded panels with integral fittings or of corrugated plastic panels (such as polypropylene) with features such as edge fittings bonded to the panels. Folding of molded panels is achieved by incorporating living hinges in the mold at the fold lines. Corrugated polypropylene can be folded using methods long used for cardboard boxes, namely creating fold lines by pressing a tool edge in the desired location; the corrugations are crushed forming a fold line if the line is orthogonal to the corrugations while one or two corrugations are flattened if the line is along the direction of the corrugations.

The edges of these cases are assembled progressively from base to top edge by engaging nibs which protrude at right angles to each panel on the inside at each corner. The engagement is reminiscent of the co-planar engagement elements of an ordinary zipper; however, these nibs engage at right angles (orthogonal to each other); they are of a different shape and resilient material, and the engagement is manually accomplished without the use of a metal guide. The corners are separated to collapse the container by just pulling apart a corner progressively from top edge to bottom by hand. For all except the smallest containers, an inverted U-shaped captive metal locking pin is used to lock the side panels at the top edges at each corner; these are simply engaged or disengaged by the "lift and rotate method" to resist pulling apart. Again depending on size of a case and material being carried, further corner reinforcement is achieved by using one or more short Velcro straps attached to side panels on the outside of the corner. If deemed necessary by application, further side panel reinforcement is achieved by incorporating a stiff rod (such as a ⅛" diameter steel rod) at each top edge to strengthen the side panels. Multiple carry cases can be stacked on top of one another when assembled and in use. Collapsed carry cases with panels snapped together can be stacked horizontally or stored vertically. Carry cases can have rectangular side panels which result in straight vertical sides when assembled, or the side panels can be trapezoidal which results in inwardly sloped sides for more ease in filling or emptying cases with contents. The latter also nest compactly when empty.

The first embodiment is a tote box with hand-hold cutouts on two opposing sides. It is optionally fitted with an attached cover which is hinged (at a fold line) to the top edge of one of the sides. This embodiment can be made in a wide variety of sizes with or without hand holes and covers.

A second embodiment which is air and water tight is preferably made in small sizes (as for storage of food items) using molded transparent plastic panels. A resilient seal is bonded to one of each pairs of mating side edges adjacent to a row of engagement nibs. When assembled, the engaged nibs of the second side compress the resilient seal rendering the edge sealed. The nib profile is such that it biases the corner to pull the sides together when the nibs are engaged. The seal does not alter the method of assembly or disassembly. A cover is attached to one side at the top edge at a fold which acts as a hinge (as in the first embodiment). The cover has an inner linear seal along the three cover edges adjacent to the overhanging lip but a short distance away leaving a groove which engages and compresses the seal against the inner surface of the top edges of the three sides thereby sealing the cover to the sides when pressed down. In a further embodiment, there is no fold-hinged top. Instead, a molded top cover of more resilient plastic with a continuous integral seal on all four edges is used; this could be made of a variety of thermoplastic elastomers or even silicone. This cover is sized such that the seal engages the top edges of all four sides; the seal is effected by pressing down whereby both the inner and outer container side surfaces are captured in the groove of the integral seal. Since this molded cover is separate, it is attached to the back side of the container loosely at the top edge by a strip of elastomeric tape so as not to interfere with the proper alignment and engagement or disengagement of the cover.

The next embodiment is a push/pull cart which can be of substantial dimensions (such as a tub 3' high, 3.5' long and 3' wide) with an integral bottom steel frame and four double casters for easier maneuverability. This push cart has a cover hinged at a fold line with four cut-outs to accommodate the casters of a cart stacked above (whether assembled or flattened). The cut-outs prevent the casters from causing a stack of push carts from sliding off one another. Using a particular sequence of folding and snapping the panels together when collapsing a tub, the push cart is transformed into a compact flat shape attached to the bottom frame. In yet another embodiment, the push cart is fitted with a fail-safe central-locking brake system. The brake is engaged by a foot pedal which is pushed down into a latched position providing both auditory (a click) and tactile (through the foot) feedback of having achieved the locked state. The brake is disengaged by a brake release pedal which unlatches the brake pedal whereby it rises. The brake pedal engages four separate brake elements on all four double casters which keeps each caster from rotating or swiveling.

In an alternate embodiment the push cart is height adjustable by means of a plurality of fold lines which separate respective side panels and the cover panel into respective half panels.

BRIEF DESCRIPTION OF THE DRAWINGS

The present invention can best be understood in connection with the accompanying drawings. It is noted that the invention is not limited to the precise embodiments shown in drawings, in which:

FIGS. 8A, 8B, and 8C show three views of a transparent air and water-tight food container built according to this invention; 8A is a perspective view with the lid closed, 8B is a perspective view with the lid open showing the four-sided gasket, and 8C is a side elevation showing the elastomeric cover hinge.

FIGS. 12A-12D illustrate the four steps required to fold the push-pull cart to a compact configuration shown in FIG. 12E.

FIG. 13A shows the metal subframe with braking components attached. FIG. 13B is a side detail of the brake pedal subassembly. FIG. 13C is a side view of a ring brake element, while FIG. 13D is a top view.

DETAILED DESCRIPTION OF THE DRAWINGS

Figure 1:
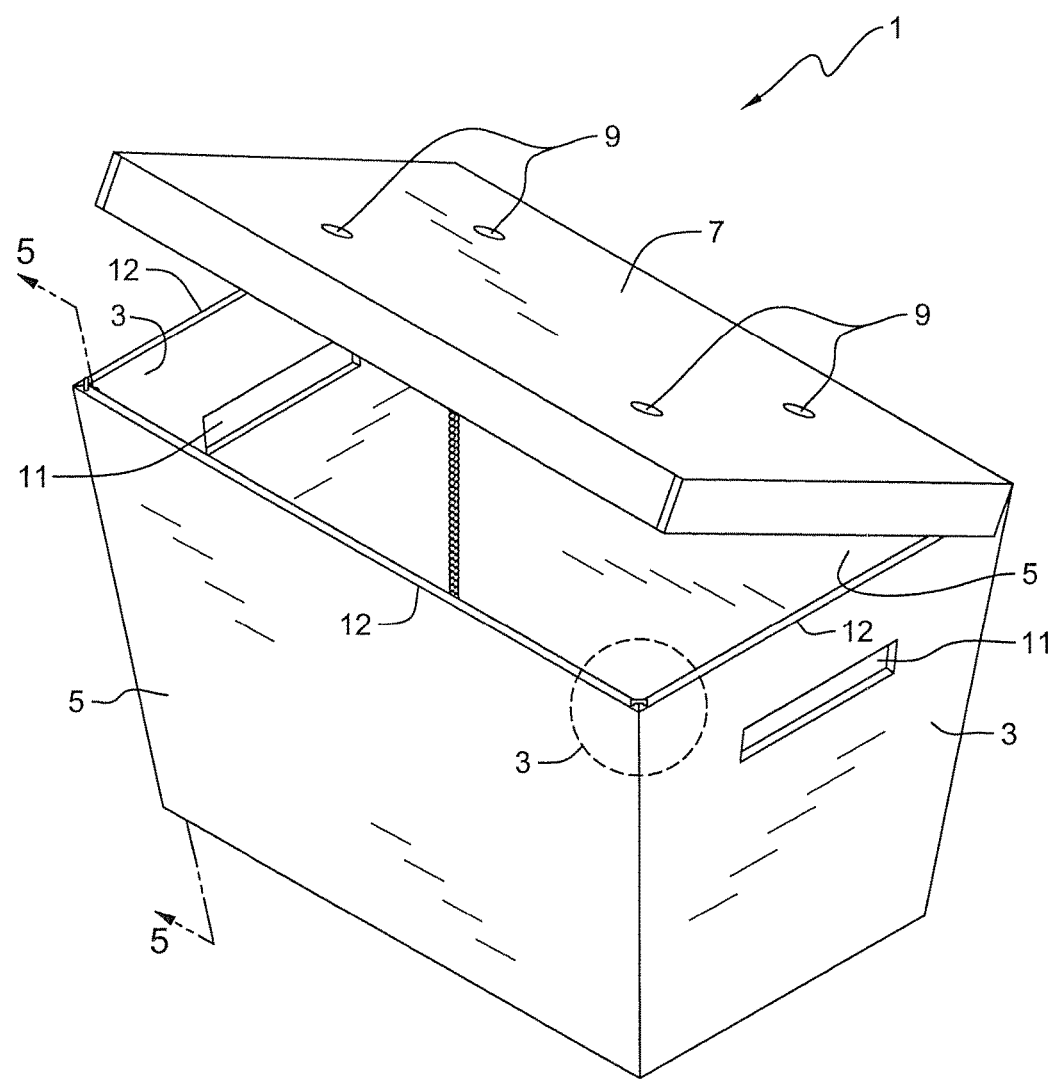
FIG. 1 is a perspective view of an assembled collapsible tote box constructed in the manner of this invention.

FIG. 1 shows a collapsible tote box 1 with cover 7 and hand holes 11 in opposite end panels 3. A bottom 17 (shown in FIG. 2) and two side panels 5 complete the carrying case in the form of this tote box 1. Optional reinforcement rods can be attached (or molded over) at top edges 12. Indentations 9 on the top of cover 7 are in registration with molded feet on the bottom (not shown) to permit stacking of assembled tote boxes 1 while resisting sliding sideways.

Figure 2:
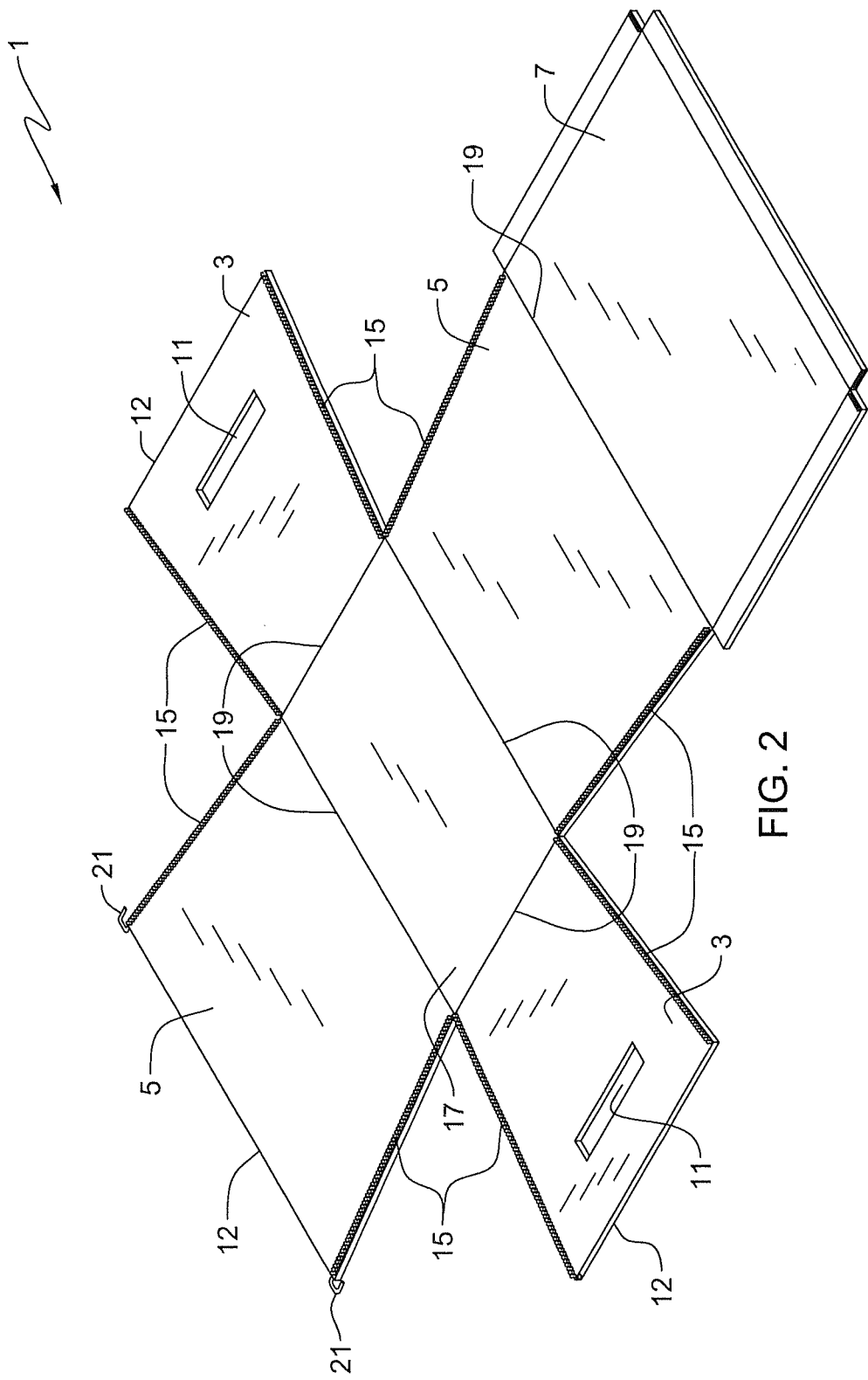
FIG. 2 is a perspective view of the tote box of FIG. 1 with all panels flattened to a collapsed configuration.

FIG. 2 shows a collapsed view of tote box 1 showing the location of rows of assembly nibs 15 at adjacent panels. Lines 19 denote fold lines which may be living hinges if box 1 is molded or actual folds if corrugated plastic panels are used.

Figure 3:
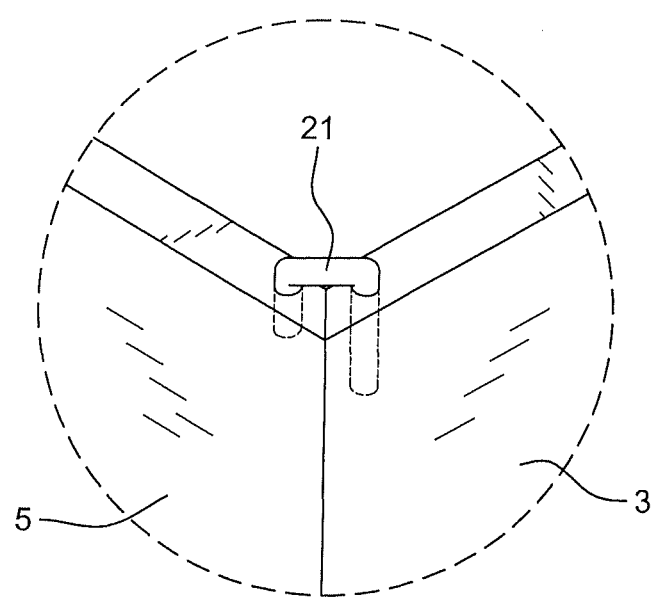
FIG. 3 is a close-up perspective detail of a corner reinforcing (inverted U) locking pin with one captive leg which keeps it attached to the collapsible container.

FIG. 3 shows a captive inverted U-pin 21 used to reinforce the corner at the top. The longer leg is captive (not detachable) but permits lifting of pin 21 out of contact with adjacent panel 3 or 5 and also permits rotation for disassembly and assembly.

Figure 4:
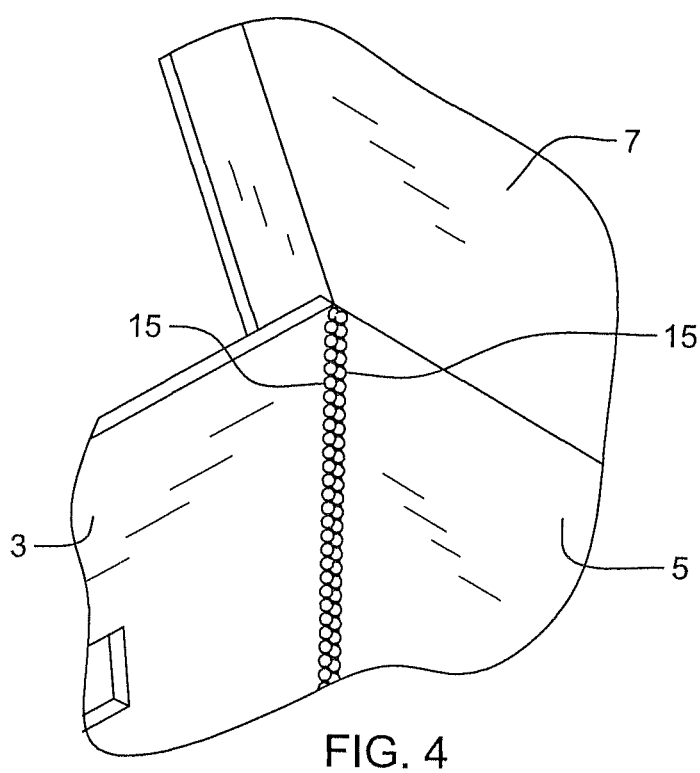
FIG. 4 is a close-up perspective detail of an inside corner of the tote box of FIG. 1 showing the engagement of a line of nibs protruding at right angles from the surfaces of adjacent sides.

FIG. 4 is a detail showing the engagement of the rows of nibs 15 attached to adjacent panels; these are used to progressively assemble and disassemble tote box 1.

Figure 5:
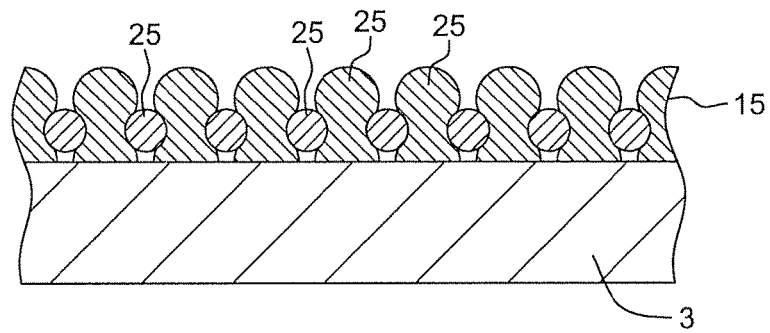
FIG. 5 is an enlarged side crossectional view of an edge joint showing the fit of nibs of FIG. 4 with their profile clearly outlined.

FIG. 5 shows a crossection detail of the two rows 15 of adjacent orthogonal nibs 25 as engaged. The profile of each nib 25 is shown with dome section at distal end, smaller neck, and wider base attached to box panel 3. These nibs 25, in most cases, would be molded separately in strips 15 which are then attached along the edges of the box. This permits them to be molded of a flexible material, such as a thermoplastic elastomer (TPE) or silicone which is more flexible than the material of the tote box, a more rigid resin such as polypropylene, polycarbonate, PVC, etc. It is noted that the engagement at the neck of each nib 25 causes the nibs to actually pull the panels together at the corners.

Figure 6:
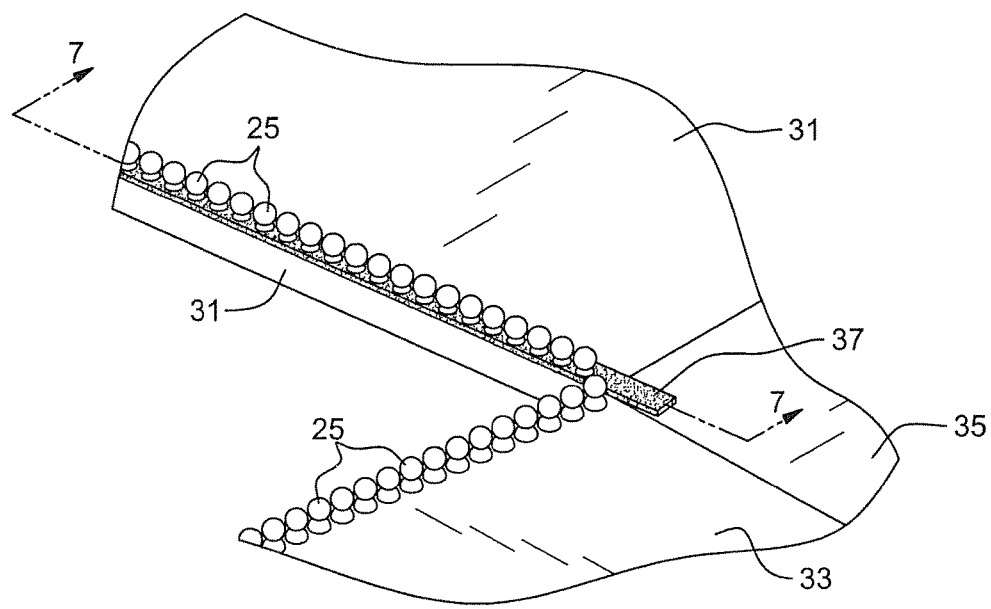
FIG. 6 is a perspective detail of adjacent edges of sides of a carrying case when in a flat collapsed configuration showing the addition of a linear seal to seal the corner when assembled.
Figure 7:
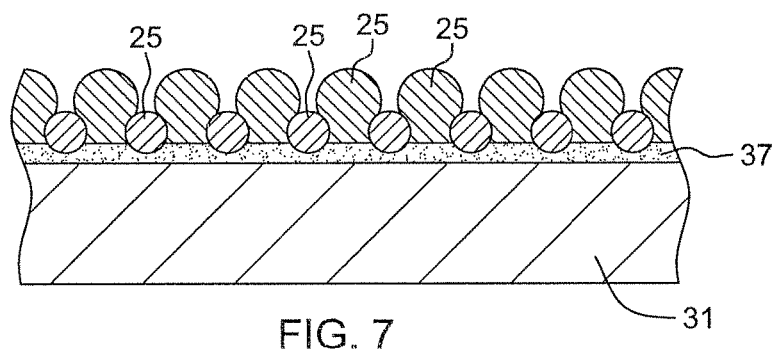
FIG. 7 is an enlarged side crossectional detail (as in FIG. 5) with the addition of the linear seal of FIG. 6 showing the seal sealing the crossed engaged rows of nibs.

In an alternate embodiment of FIGS. 6 and 7, the carrying cases are required to be air and water-tight. The linear seal or gasket 37 shown added around the base of a line of nibs 25 of one of a pair of adjacent nib lines in FIG. 6 before assembly will seal that edge after assembly of sides 31 and 33 as they are progressively interlocked from bottom panel 35. FIG. 7 is a crossectional view showing crossed engaged nibs 25 deforming linear seal 37 locally to effect the seal.

Figure 8A:
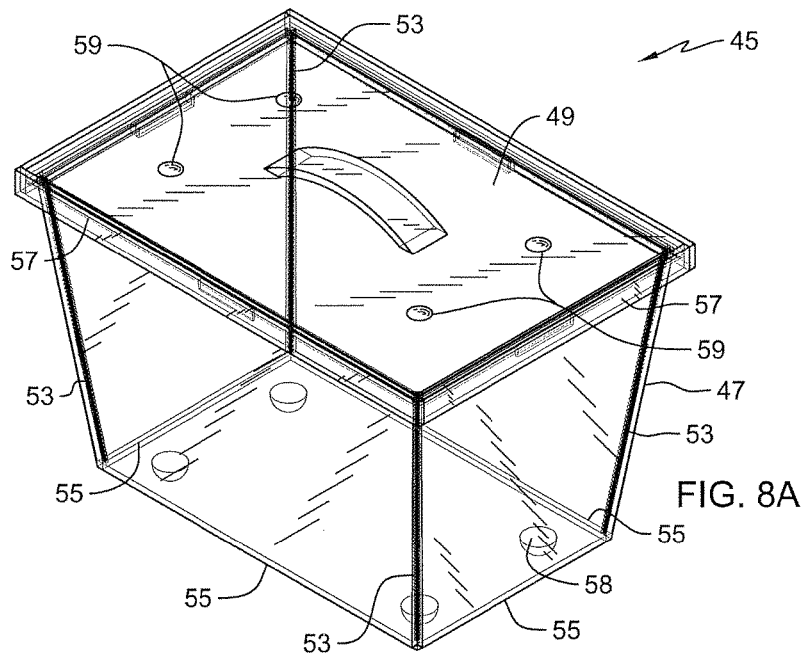
Figure 8B:
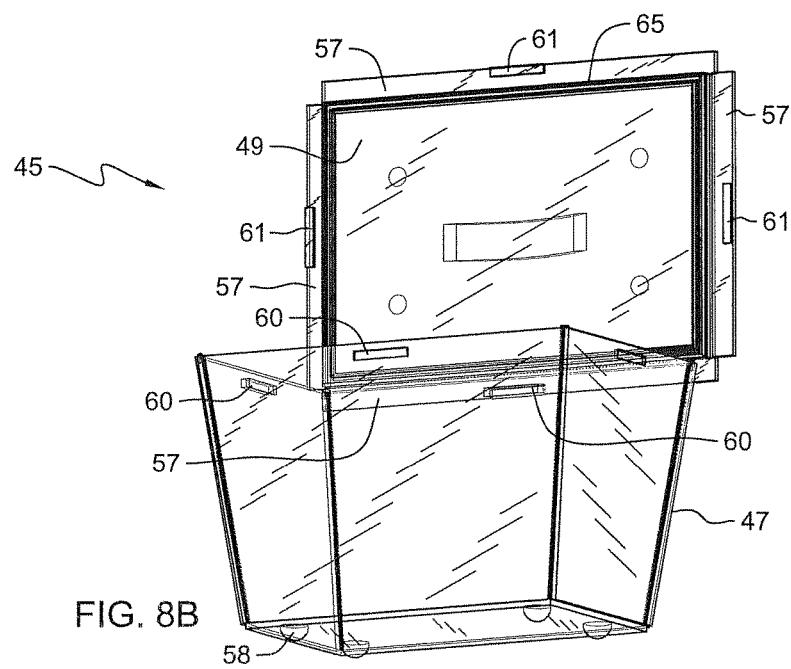

A small collapsible water tight food container 45 is shown in FIGS. 8A-8C. It is made of transparent panels with a transparent cover 49 both for aesthetics as well as utility to be able to view and identify the contents. To insure air and water-tightness, edges 53 are assembled from sealed nib lines as shows in FIGS. 6 and 7. Fold lines 55 are molded living hinges. Cover 49 is made of a transparent TPE or silicone with integrally molded gasket 65 along all four edges capturing and sealing the top edge of all four rigid side panels. For extra sealing insurance, extra sealing can be added inside cover 49 at the corners. Flaps 57 around all four edges of cover 49 have male protrusions 61 which fit into and lock within molded recesses 60 molded into the sides in registration. These locks keep cover 49, seal 65 and the top edges of container part 47 in intimate contact. Elastomeric hinge 67 (see FIG. 8C) attaches cover 49 to container 47 in such a manner so as not to interfere with the proper alignment, engagement or disengagement of cover 49 which must be pressed down vertically. Recesses 59 in cover 49 are in registration with molded feet 58 to prevent stacked containers 45 from sliding off each other.

Figure 9:
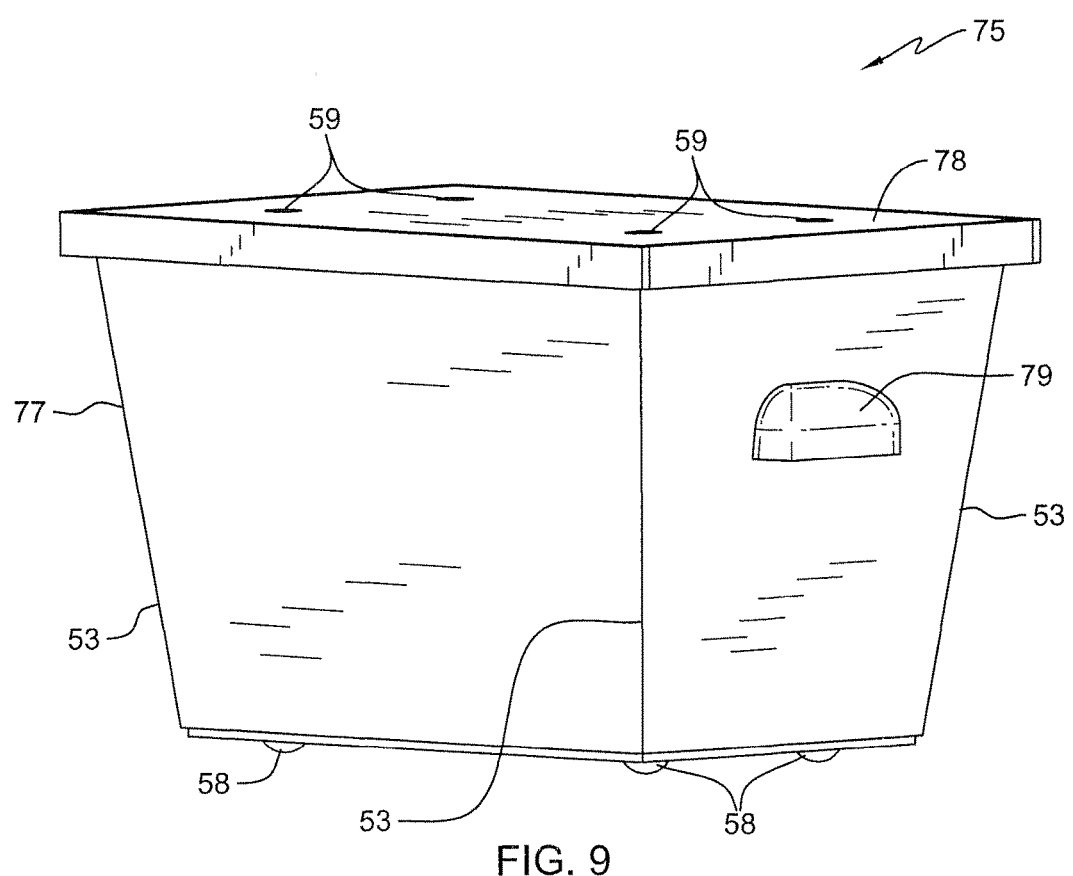
FIG. 9 is a perspective view of a collapsible produce carrying case of larger dimensions than that of FIG. 8 with external handles, but which shares the air and water-tight sealing of the smaller containers.

FIG. 9 shows a larger collapsible produce carrying case or tote 75 with external handles 79. The construction is similar to that of food container 45 also being air and water-tight although not necessarily transparent. Cover 78 may be molded with integral seal, or a rigid cover with attached resilient seal within may be used to seal with the top edges of container 77.

Figure 10:
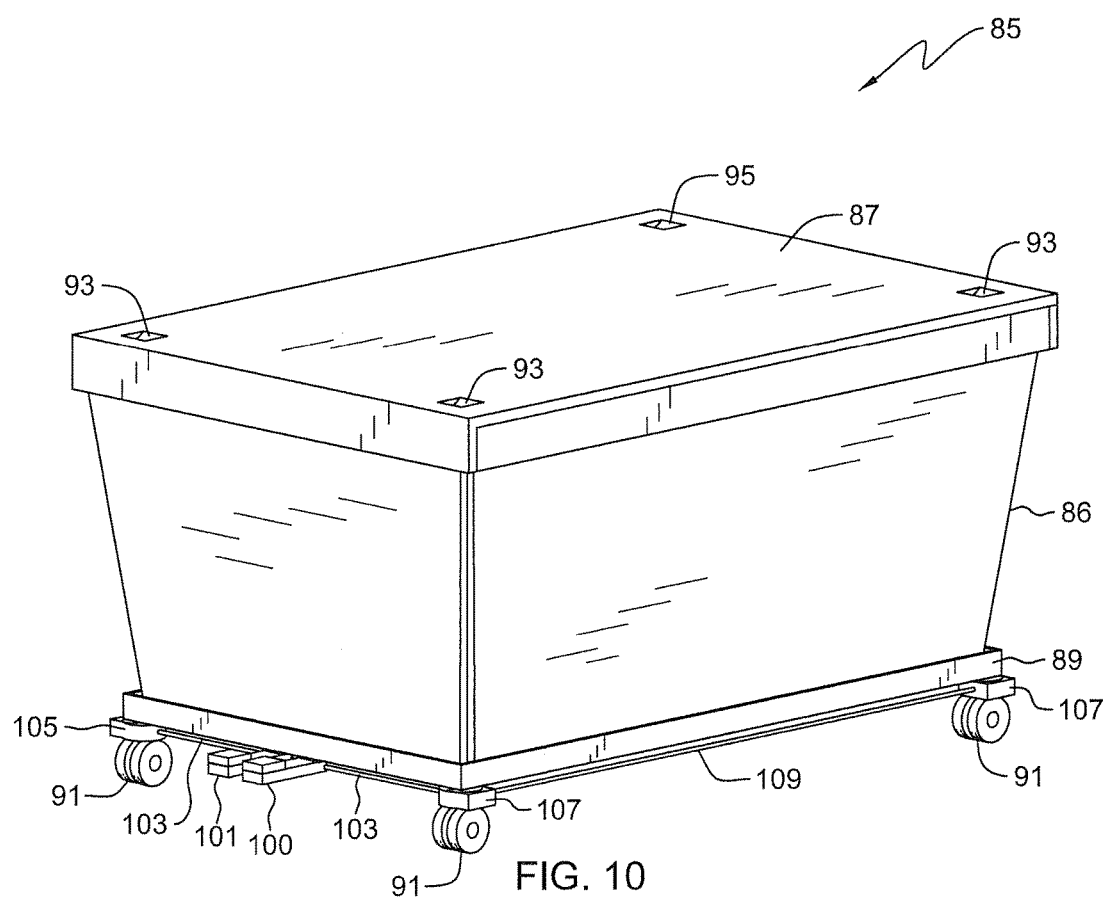
FIG. 10 is a perspective view of a push-pull cart attached to a bottom metal frame with casters; it is constructed with rows of nibs on the edges and folding sides so it can be collapsed and then folded compactly atop the metal frame. It is shown with the optional central braking system.
Figure 11:
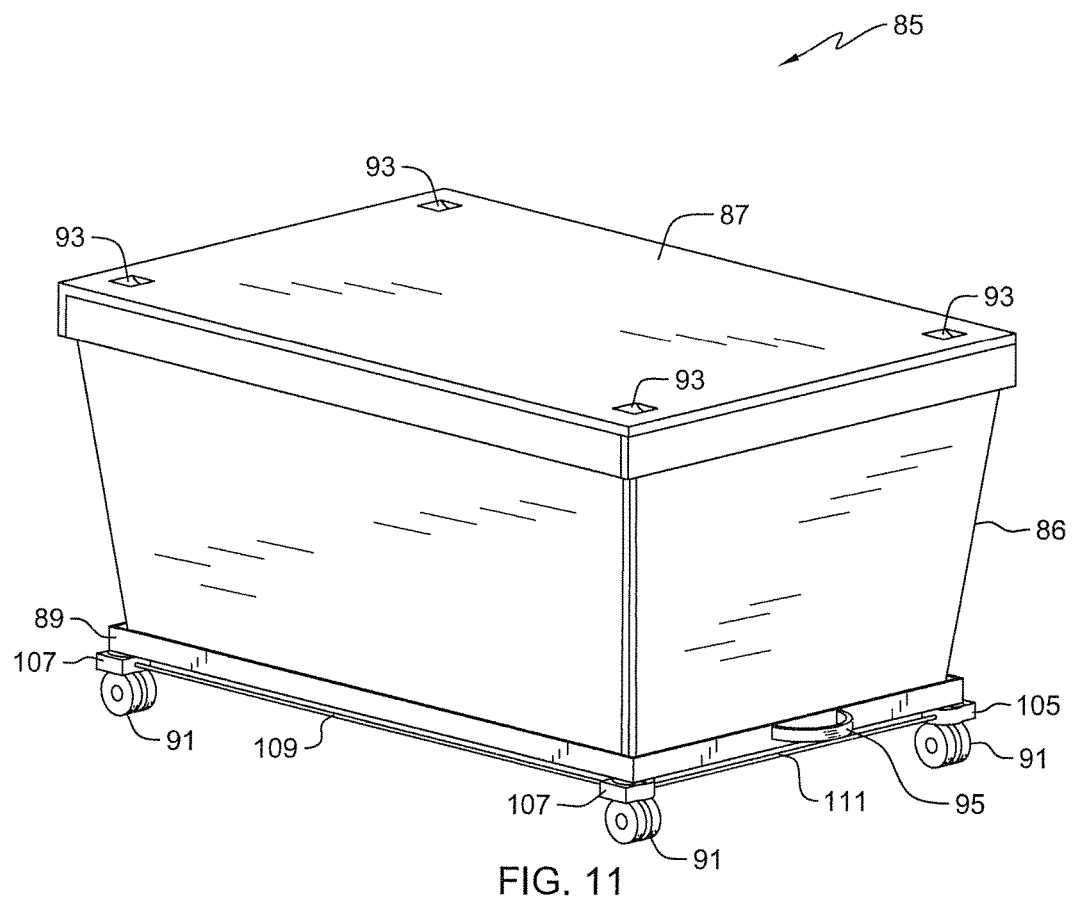
FIG. 11 is a perspective view of the push-pull cart of FIG. 10 showing the front end with tow loop.

FIG. 10 is a side and back view of the push-pull cart 85 of this invention. It is attached to a metal subframe 89 with four double casters 91 for ease in moving in any direction with minimal resistance. Elements of the optional central braking system are shown and will be described later in more detail in FIGS. 13A-13D. Container section 86 is assembled as described in previous embodiments using strips of engagement nibs at all four upright edges. The bottom is attached to the metal frame in a permanent fashion. Cover 87, which is hinged at a fold line to the back side, has four recesses 93 on the top to accept four double casters 91 of a push-pull cart which may be stacked atop in either the assembled or folded down configuration to prevent sliding off. FIG. 11 shows the front of cart 85 revealing tow loop 95.

Push-pull cart 85 has side panels which cannot be folded backwards at the bottom hinge lines because of attached metal bottom frame 89. A four step folding procedure of the collapsed cart is shown in FIGS. 12A-12D. In step 1 of FIG.

Figure 12A:
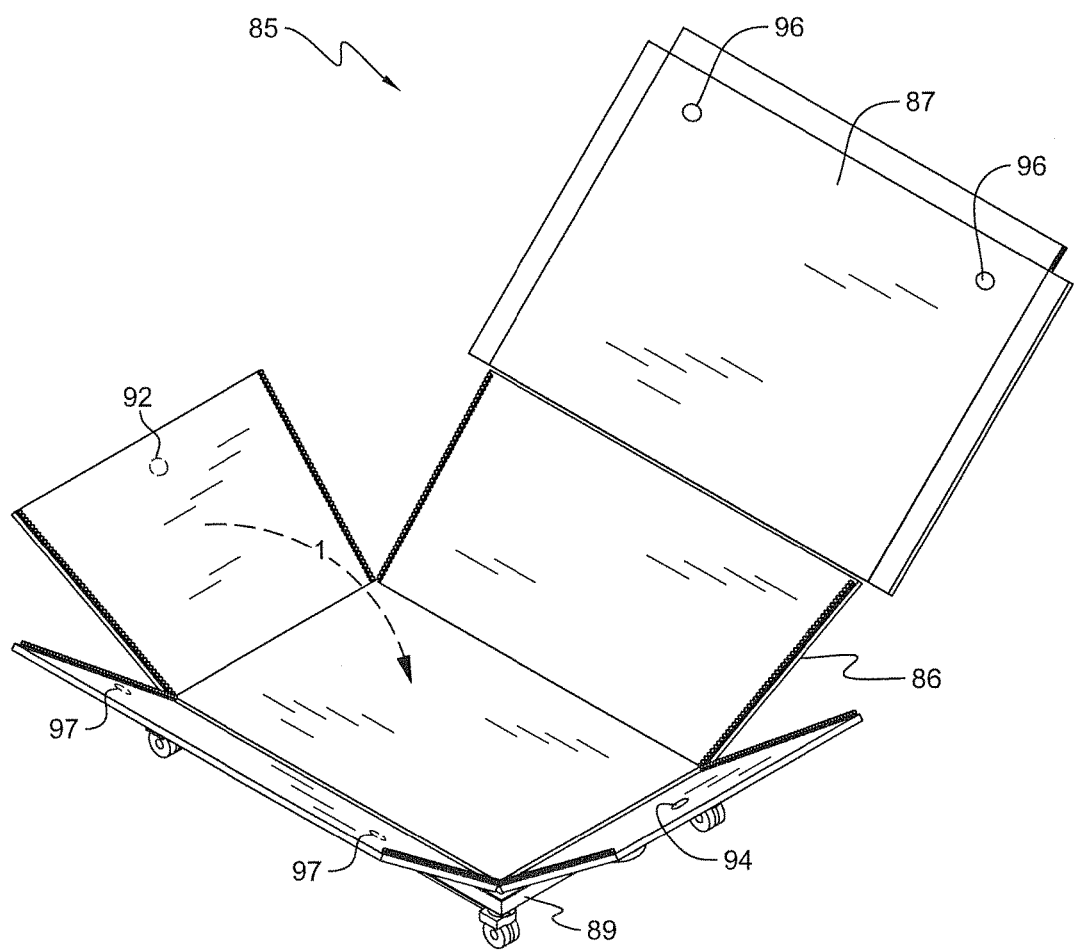
FIGS. 12A-12E show the steps involved in collapsing and then folding the push-pull cart of FIG. 10.
Figure 12B:
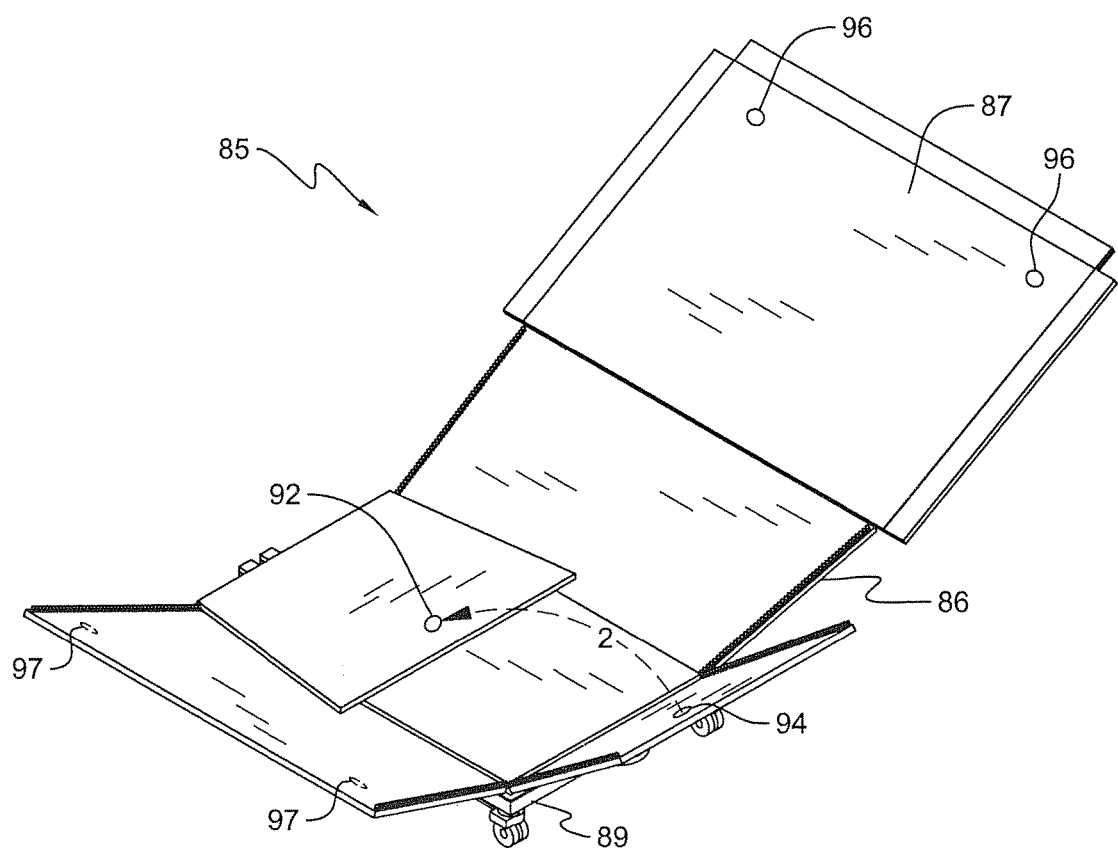
Figure 12C:
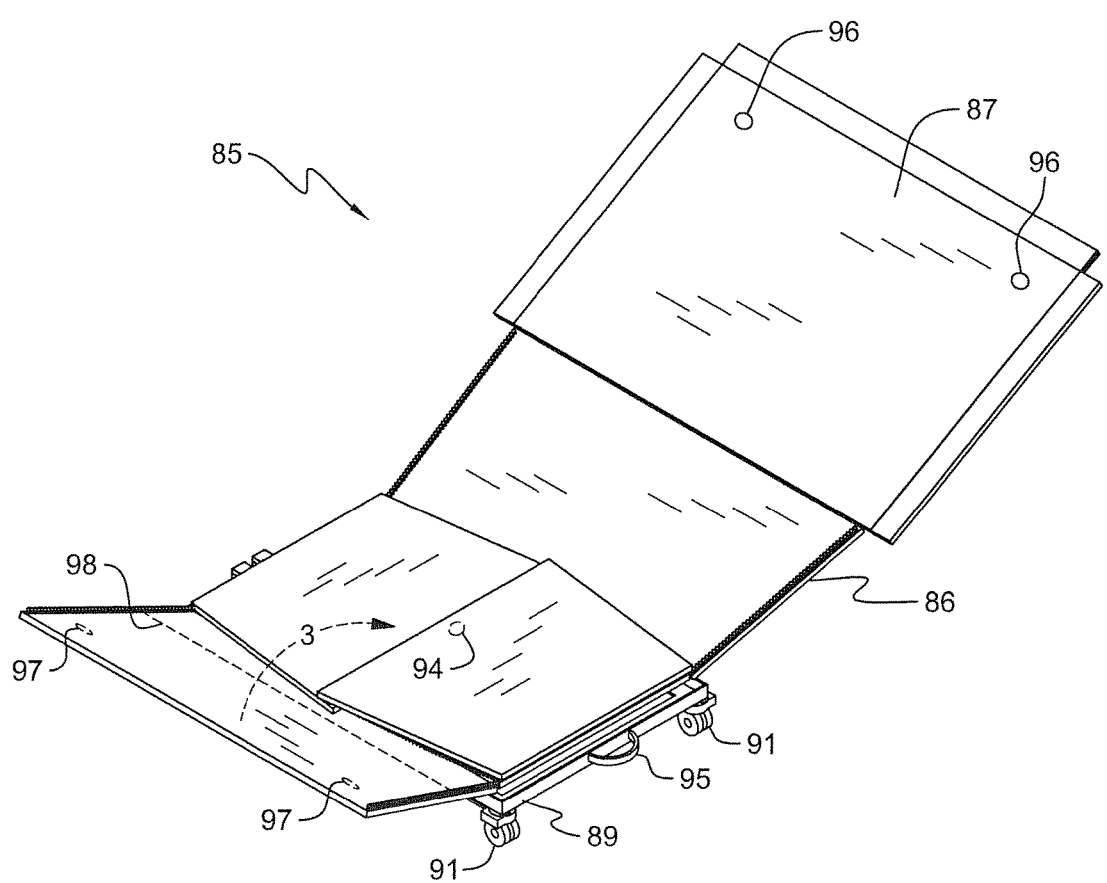
Figure 12D:
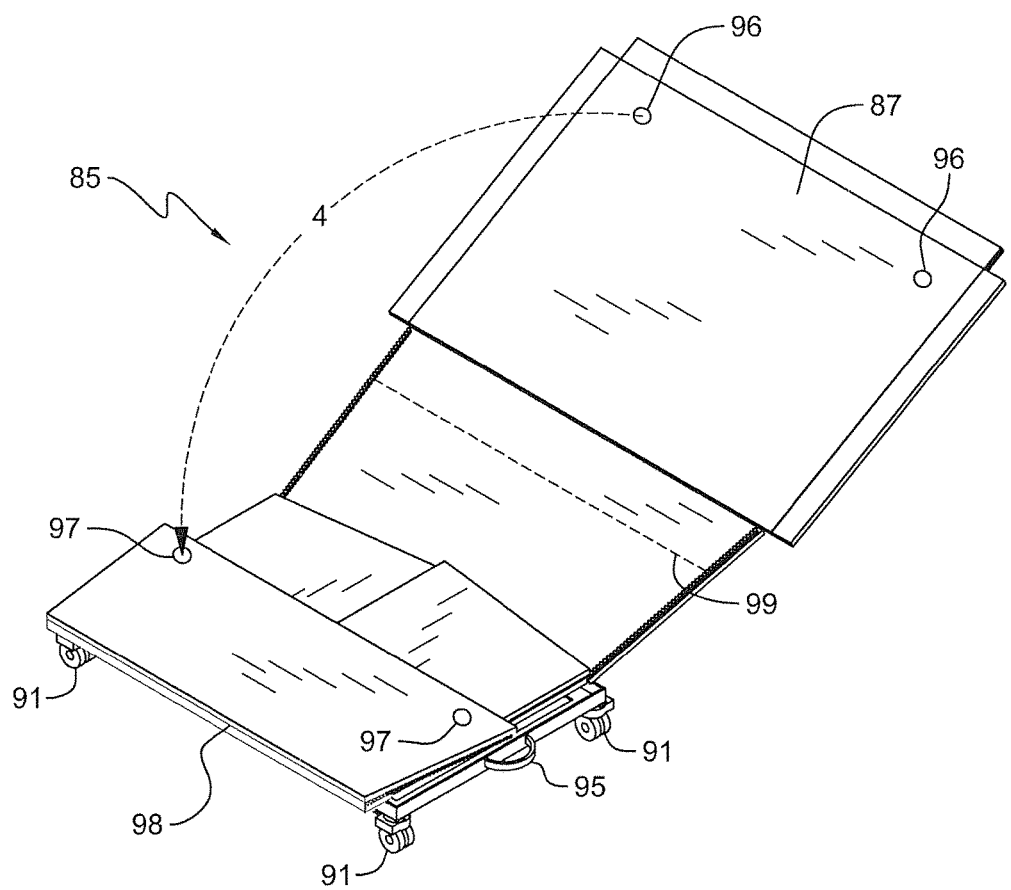
Figure 12E:
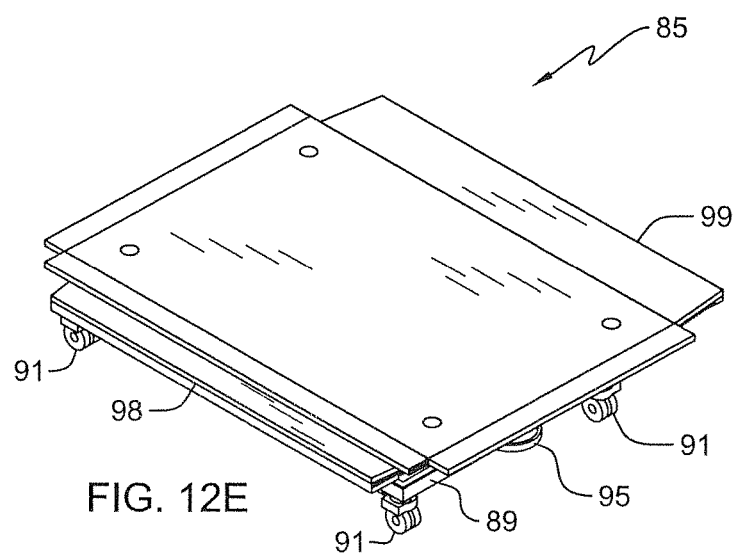

12A one sees one end being folded inward toward the bottom which will place outside surface snap 92 facing up. Also shown are mating snap 94 on the opposite end panel, and snaps 96 on the inside surface of cover 87 and mating snaps 97 on the outside of the opposite side panel. In step 2 of FIG. 12B the other end panel is folded inward and snapped into 92 via inside snap 94. In FIG. 12C a fold line 98, only used in the collapsed configuration, is revealed. In step 3 side panel is folded inward at 98 placing outside snaps 97 face up. In FIG. 12D fold line 99 is revealed on the opposite side; it is only used in the collapsed configuration. In step 4 cover 87 with a portion of the attached side are folded inward at line 99 wherein inside snaps 96 are mated with snaps 97 thereby completing the fold sequence resulting in the compact snapped together configuration shown in FIG. 12E. In the folded embodiment shown in FIGS. 12D and 12E, further fold lines (not shown) can be provided so that all of the panels 87, etc., are folded within the confines of the perimeter of chassis frame 89 of cart 85, to prevent damage to panels 87 of adjacent carts 85 or other fixed objects.

Item numbers 100 and above are reserved for optional brake subsystem components. Some of these may be seen on FIGS. 10 and 11. Although many variations are possible, FIGS. 13A-13D show (in schematic fashion) one workable implementation. The braking system is engaged on all four double casters simultaneously (components will also work on single casters) by pressing down on a brake pedal until it is latched in the down position. This engagement prevents casters from rotating or swiveling regardless of the direction they were pointing at the time. The brake is simultaneously released from all four double casters by pressing the release pedal which releases the brake pedal latch permitting the return spring to lift up the brake pedal. The action is fail-safe in that a defective pedal return spring or gear or rod will not release the brake action once it is latched; this will prevent the push-pull cart from careening down a slope.

Figure 13A:
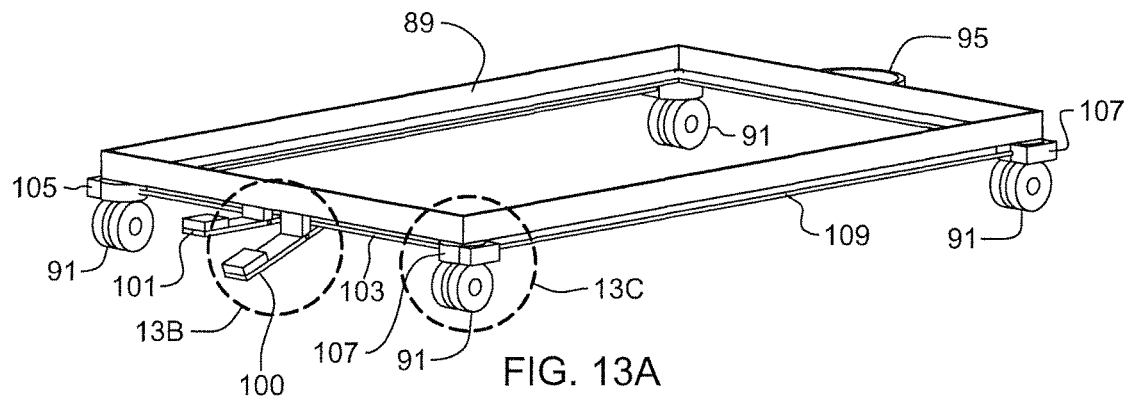
FIGS. 13A-13D pertain to the optional central braking system.
Figure 13B:
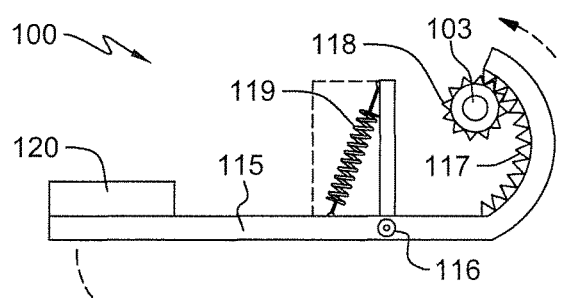
Figure 13C:
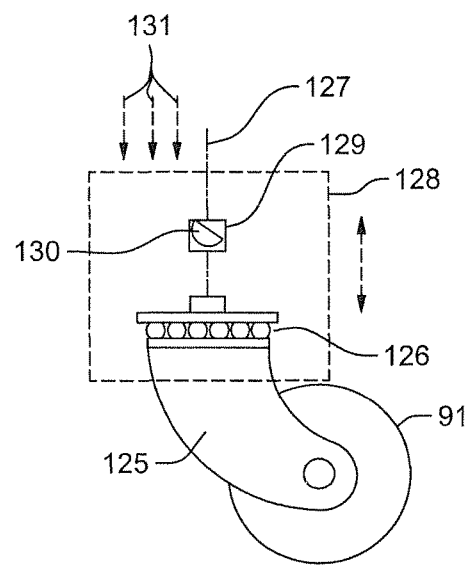
Figure 13D:
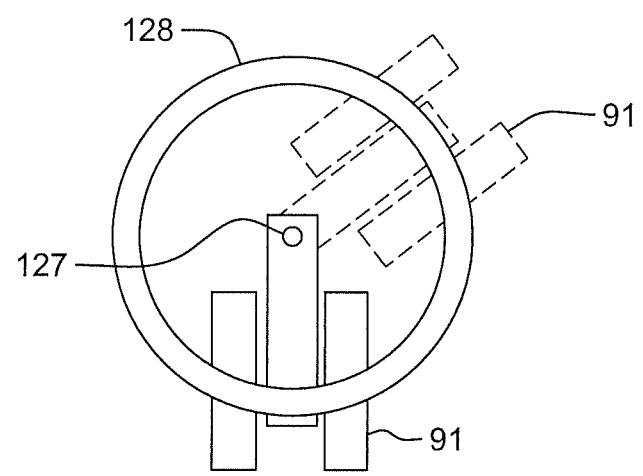

FIG. 13A shows bottom metal frame 89 detached from container section 86 for clarity. Brake pedal 100 and release pedal 101 are shown at the rear of cart 85; brake rod 103 goes from housing 107 to housing 105 through the brake pedal assembly gear 118 (shown in FIG. 13B). Housings 105 (also shown in FIGS. 10 and 11) contains a ring brake element as depicted in FIGS. 13C and 13D. Housings 107 as also shown on FIGS. 10 and 11 include ring brake elements as in 105, but they also have a pair of meshed bevel gears (preferably molded plastic) to extend the action of brake rod 103 synchronously to extension rod 109 and onward to front brake rod 111 (shown at the front in FIG. 11). FIG. 13B illustrates the side view of brake pedal assembly 100. Rigid chassis 115 is pivoted at 116 and pulled up to the "brake not applied" position by robust extension spring 119. The front of chassis 115 is configured as a sector of internal gear 117 which is meshed with pinion gear 118 which turns brake rod 103. Rubber pad 120 is at the distal end. Gear 118 is sized to turn 180 degrees over the excursion of brake pedal 100 over its rotation from up position to bottom latched position (latch not shown). In this manner, the rotary motion of brake rod 103 which operates on the two rear double casters is conveyed along the side via extension rod 109 through meshed bevel gears (not shown) in rear housing 107 and then onward through brake rod 111 at the front through front meshed bevel gears in 107 to operate the front two double caster ring brakes.

The operation of the ring brake elements 128 above each double caster is illustrated in side view 13C and top view 13D. Caster 91 (depicted as a single caster for clarity) with arm 125 and swivel ball bearing 126 is shown under ring brake element 128 which is centered on swivel axis 127. The bottom edge of ring brake 128 may have a ring of high friction material. Ring brake element 128 is housed in a cylinder housing (not shown) to restrict its movement to the vertical direction. The end of the operating brake rod is machined into a semicircular cam 130 and penetrates the side of 128 inside a square hole. A compression spring (not shown) exerts downward force 131 atop ring brake 128 forcing it down in contact with the top of caster 91 unless cam 130 is turned with its flat side downward within hole 129 which action lifts it out of contact releasing the braking force. "flat side down" position of all cams 130 coincide with the up (brake released) position of brake pedal 100. The top view of ring brake element 128 of FIG. 13D shows how it's being centered over the swivel axis 127 of dual caster 91 permits action regardless of caster swivel position. The redundancy of having 4 separate local braking springs atop the 4 ring brake elements is also a safety feature. While tow loop 95 is shown in FIG. 11 by itself on FIG. 89, in an alternate embodiment, two further tow loops 95 or protruding rubber bumpers (not shown) can be provided on the frame 89's side with brake pedals 100, 101 in an area spaced apart on each side of brake pedals 100, 101 to act as a bumper for brake pedals 100 and 101.

Figure 14A:
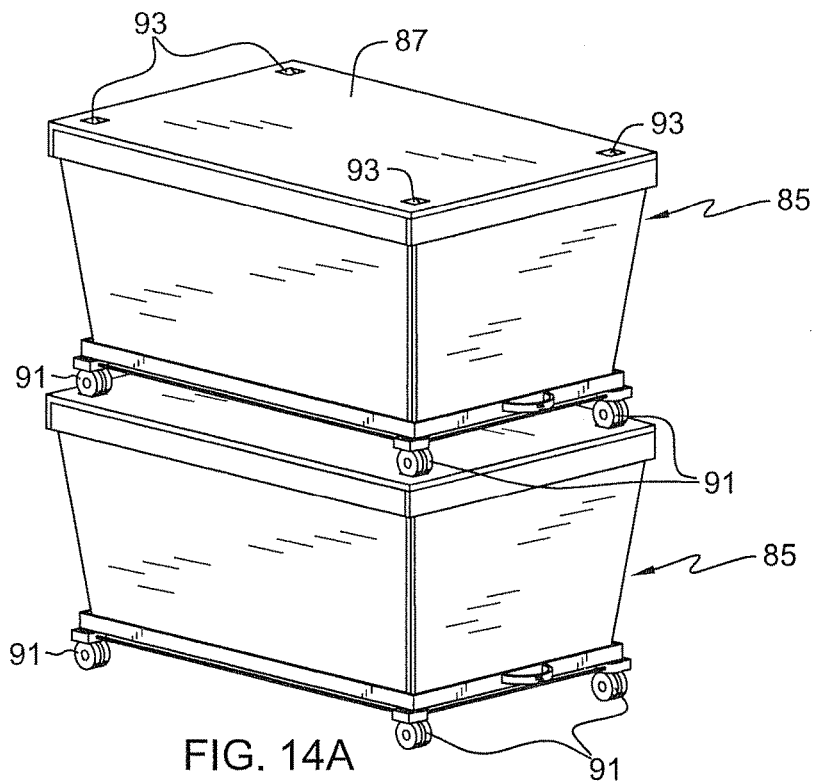
FIGS. 14A-14C illustrate how the push-pull cart of FIG. 10 is stackable in either an assembled or collapsed configuration.
Figure 14B:
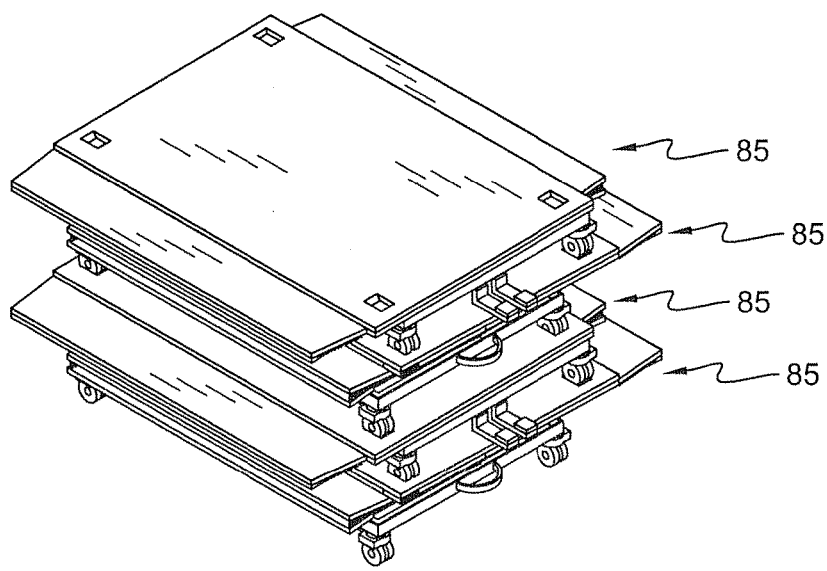
Figure 14C:
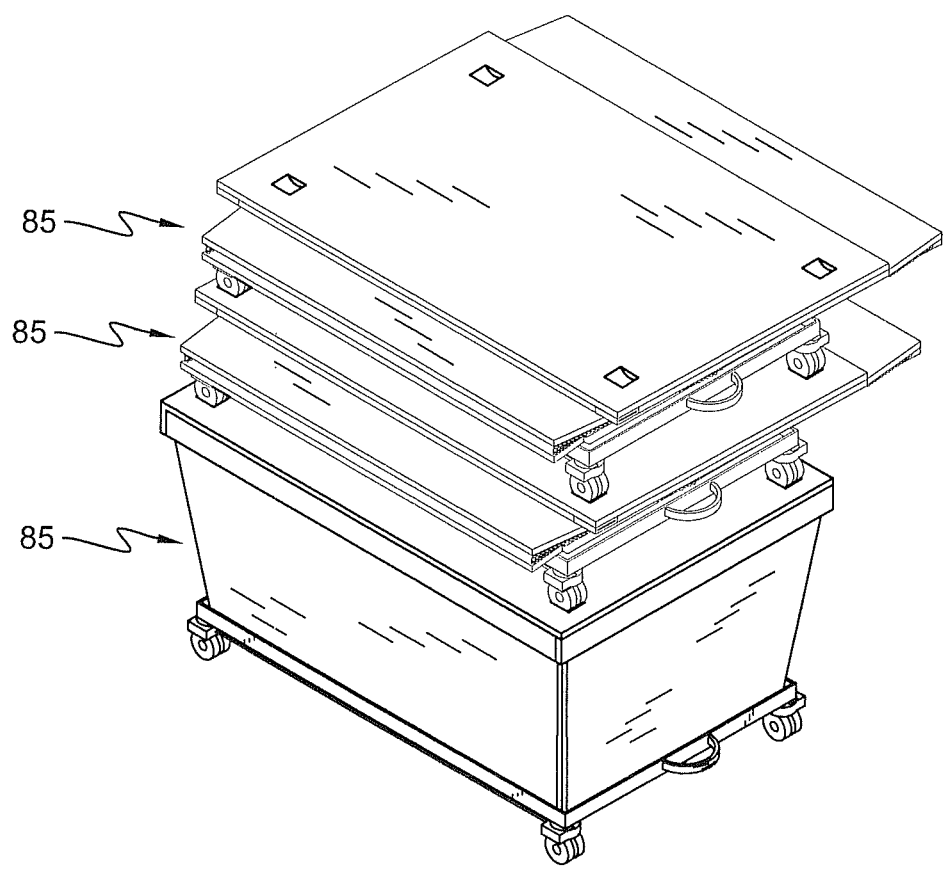

FIGS. 14A-14C illustrate the stackability of cart 85 in either the assembled or collapsed configurations. In FIG. 14A two assembled carts 85 are shown stacked atop one another with casters 91 of the top cart nestled in recesses 93 in top cover 87 of the lower cart 85. Although not limited to a stack of two assembled carts 85, in most cases space limitations or difficulty in lifting to greater heights make such stacks impractical. In FIG. 14B, a stack of three collapsed carts 85 is shown. It is practical to stack two to seven or more collapsed carts 85 as shown, again with casters 91 immobilized and captured within recesses 93. Note that by stacking collapsed carts 85 in alternating rotations as shown, a stable stack results with no tendency to topple sideways. In FIG. 14C, two collapsed carts 85 are shown stacked atop an assembled cart 85. This type of stack configuration is possible since with either collapsed or assembled carts 85, the method of stacking with casters nestled within recesses 93 in covers 87 is the same. Optionally, further fold lines (not shown) can be provided so that all of the panels of cart 85 can fold within the perimeter confines of chassis frame 89, to prevent damage of adjacent carts 85 or fixed objects.

FIGS. 15A-15I show an alternate embodiment where a push cart 185 supported on frame 189 having a plurality of wheeled casters 191, tow loop 195 and brake pedals 201, 202, is height adjustable by means of a Plurality of fold lines 198, 198a, 199 and 199a, which fold lines 198, 198a, 199 and 199a separate respective side panels 186 etc into respective joined but foldable pairs of half panels 186a/186b, 186c/186d, 186e/186f and 186g/186h when folded along the respective fold lines 198, 198a, 199 and 199a. The cover panel 187 is likewise separated by cover fold line 188 into a pair of respective half panels 187a/187b, when folded along the respective fold line 188.

Figure 15A:
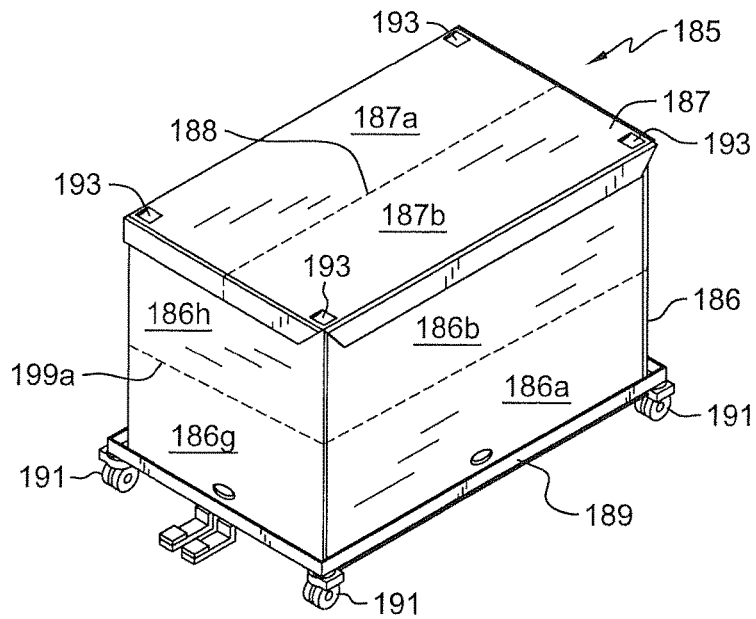
FIGS. 15A-15G show an alternate embodiment where a push cart is height adjustable by means of a plurality of fold lines, which separate respective side panels and the cover panel into respective half panels when folded along the respective fold lines.
Figure 15B:
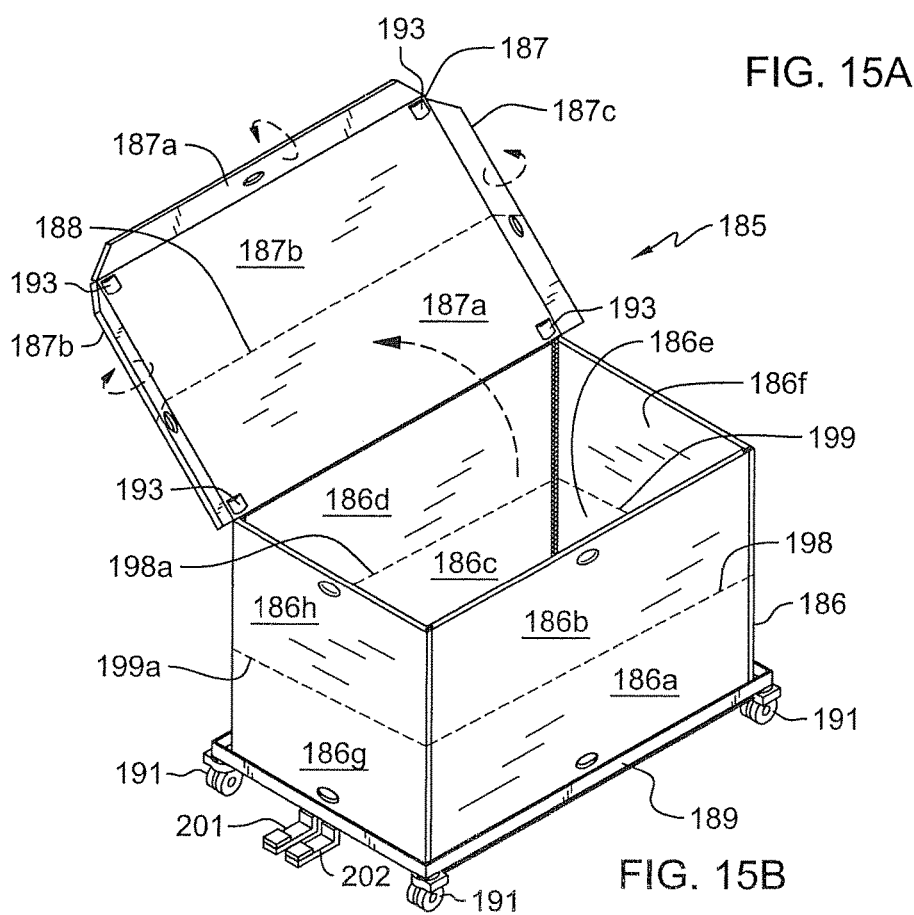
Figure 15C:
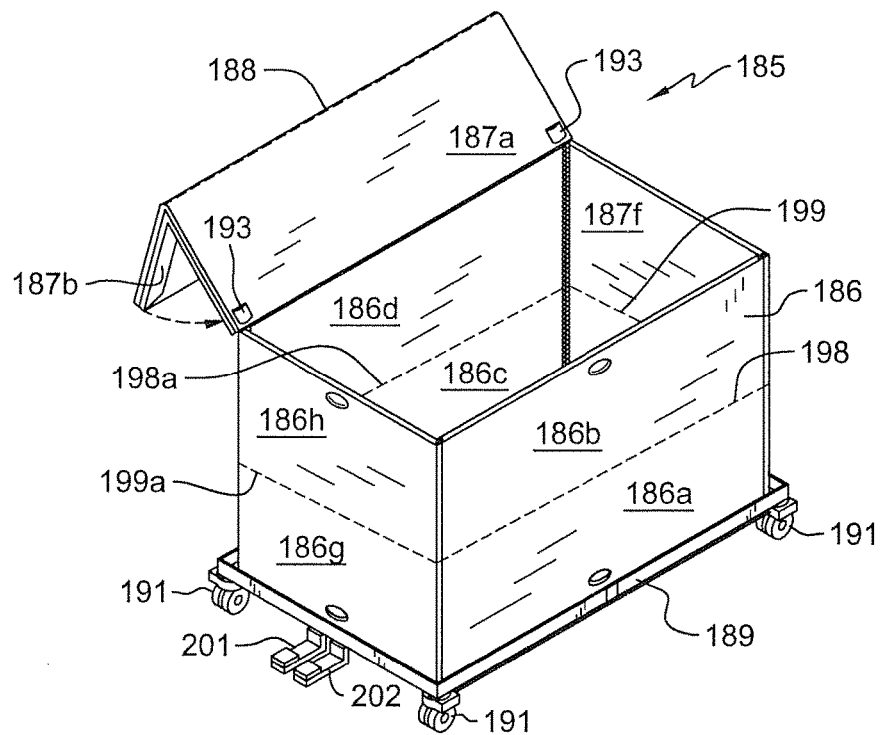
Figure 15D:
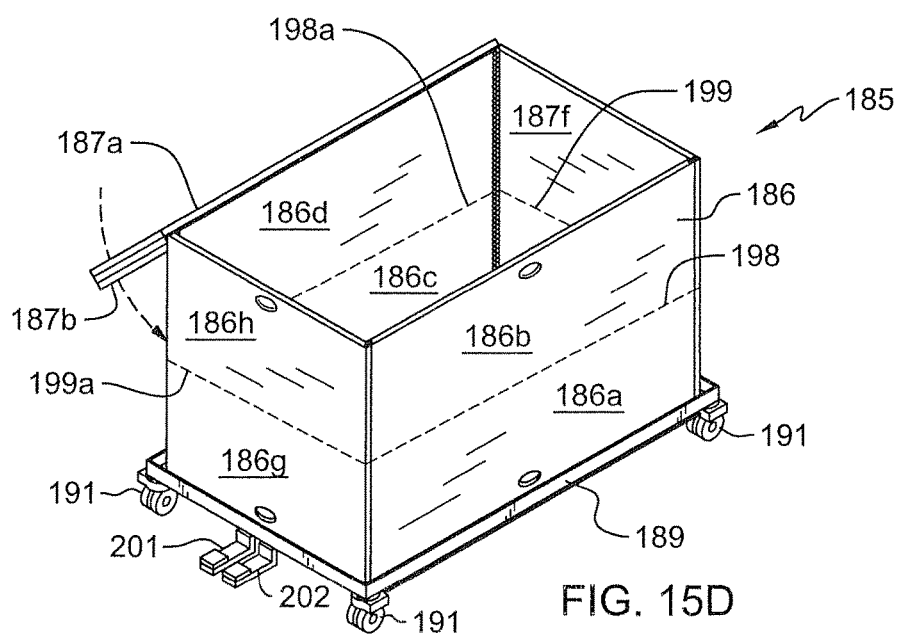
Figure 15E:
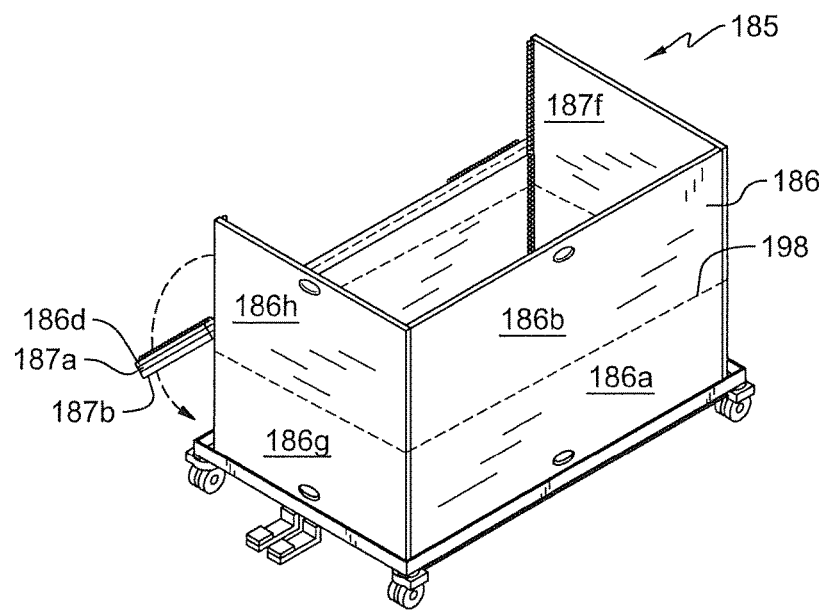
Figure 15F:
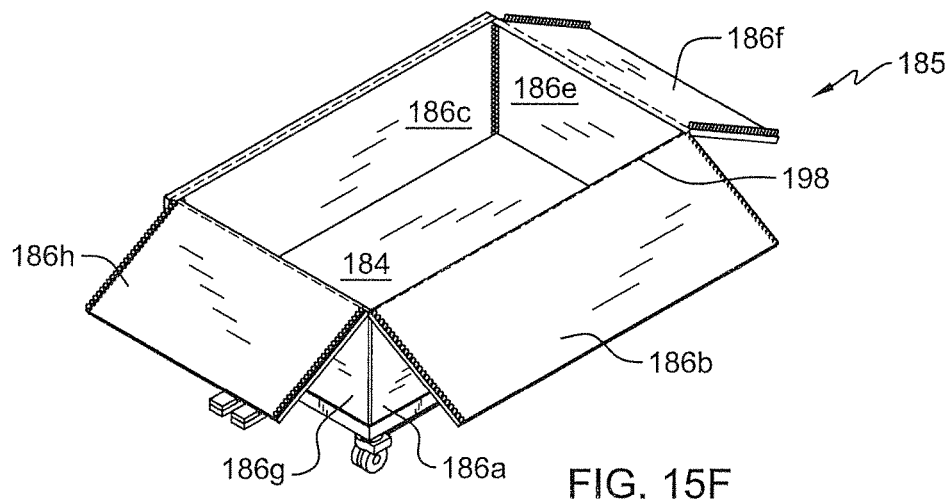

FIG. 15A shows push cart 185 unfolded and closed by cover 187. FIG. 15B shows push cart 185 unfolded and opened by opening of cover 187. FIG. 15C shows push cart 185 unfolded and but where open cover 187 is folded in half along fold line 188 between cover half panels 187a and 187b. FIG. 15D shows push cart 185 unfolded and but where open cover 187 is folded in half along fold line 188 between cover half panels 187a and 187b, which are flush against each other during further folding sequence. FIG. 15E shows push cart 185 itself beginning to be folded into a smaller height size wherein half panels 186c and 186d are folded along fold line 198a. FIG. 15F shows the folding down in the height reduction sequence of the remaining half panels 186e/186f, 186a/186b and 186g/186h, until flush with each other in the final reduced height configuration of FIG. 15G with all folded side panels tucked inside the cart. Where they may inadvertently open during use, facing folded panels are snapped together using pairs of strategically placed snap fasteners (not shown).

In the transformational sequence of cart 185 from full height to half-height as shown in FIGS. 15A-15G, the direction as well as the sequence of folding is important. For example, the folding of cover flaps 187c, 187d, and 187e upward over the top of cover 187 in FIG. 15B must be followed to support the further folding shown in FIGS. 15C-15F.

Figure 15G:
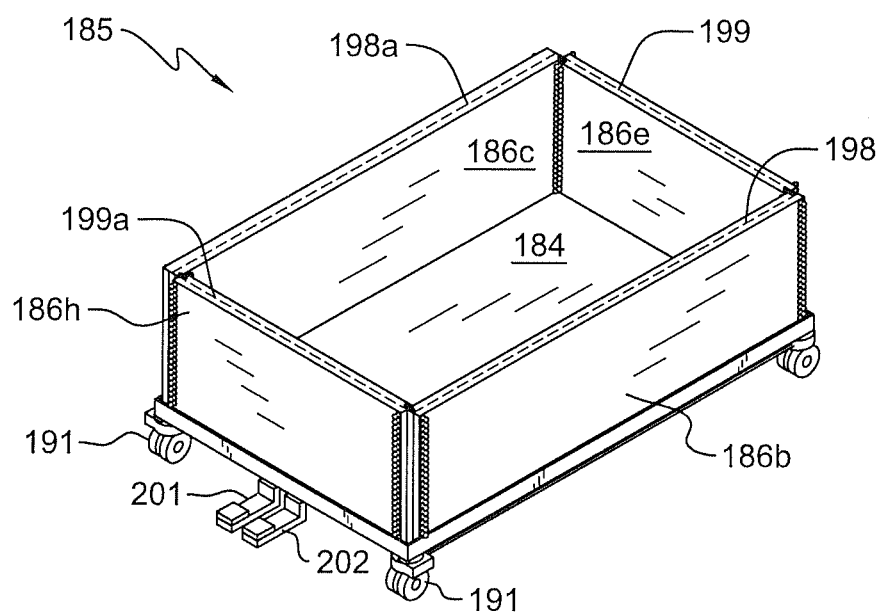
Figure 15H:
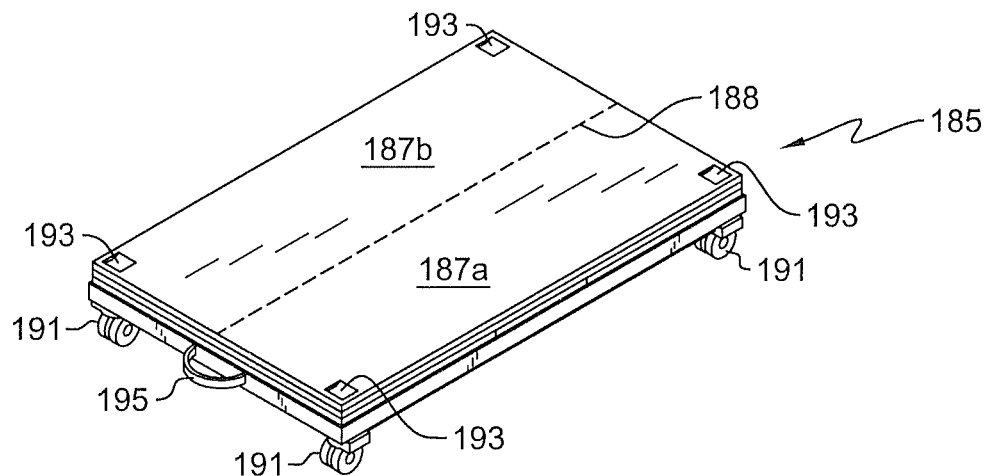
FIG. 15H shows the cart of FIG. 15G when re-folded into a collapsed configuration atop metal base with cover panels atop.
Figure 15I:
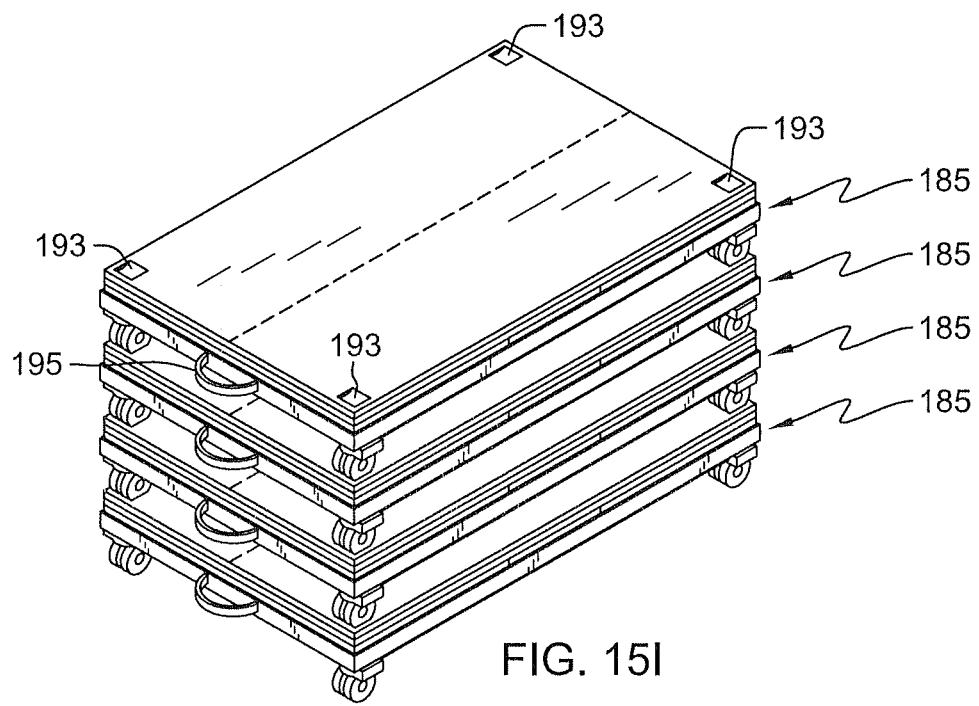
FIG. 15I shows a stack of collapsed carts with casters of upper carts nested in cover panel indentations.

In FIG. 15G the cover 187 half-panels as well as the upper halves of the side panels have been folded inside the half-height container as shown. Push cart 185 can be used in this configuration (without a cover) when it is useful to do so. To collapse push cart 185 to a flat configuration as shown in FIG. 15H from half-height configuration of FIG. 15G, folded side and cover panels are unfolded from within cart 185. Then side corner edges are detached progressively from the top to the metal frame at bottom by separating nibs. Now the spread-out but still attached panels are folded in a different sequence to achieve the collapsed configuration shown in FIG. 15H. Note that both panels of cover 187 now appear at the top of the collapsed cart 185. Carts are simply stacked as shown in FIG. 15I with casters 191 nestled within cover indentations 193 to prevent upper carts from sliding off the next lower cart in the stack. A stable stack of seven or more carts is easily possible. It is further noted that respective carriers of carts 185 of FIG. 15A to FIG. 15G can be provide with U-pins 21, which can act as safety pins to reinforce respective carriers of adjacent panels of cart 185, as shown in FIG. 3.

With respect to the embodiment shown in FIG. 15I, when carts 185 are stacked, there are not protruding parts extending outward from the perimeter of the chassis FIG. 189, other than the brake pedals 201, 202 which extended outward in a plane lower than the plane of the chassis frame 189, and the tow loops 195, which act as bumpers between adjacent carts 185. Therefore, other than tow loops 195, all of the parts of carts 185 are within perimeter confines of the chassis frame 189, and the brake pedals 201, 202 are recessed under the respective frame 189 of an adjacent cart 185. As a result, there is no risk of damage to all of the folded-down panels 187a, 187b, etc., shown in FIGS. 15A through 15G. Furthermore, when all the panels 187a, 187b, etc., are unfolded and in a position of upright use, as in FIG. 15A, filled with contents, there are also no protruding parts other than tow loop 195 and recessed brake pedals 201, 202. Therefore, in shipment of multiple carts 187 filled with contents, all of the upright panels 187a 187b are protected from damage during shipment. While tow loop 195 is shown in FIG. 15H by itself on the frame of cart 185; in an alternate embodiment, a further tow loop 195 (not shown) can be provided on the frame 189's side with brake pedals 201, 202, in an area adjacent to and overlapping brake pedals 201, 202, to act as a bumper for brake pedals 201,202.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A method of forming and using a reusable box cart comprising the steps of:
    forming said box cart from a substantially rectangular completely flat bottom panel, upwardly extending side panels connected to said bottom panel at bottom fold lines along outer edges of said bottom panel, and a cover panel joined to a top edge of one of said side panels at a cover fold line, said bottom panel, side panels and said cover panel being of one piece construction and not detachable at said fold lines, said cover panel having a recess adjacent each corner thereof, said bottom panel having a metal frame assembly including a caster adjacent each corner thereof for moving said box cart, said casters being in alignment with said recesses;
    forming said box cart into an assembled configuration by folding said side panels upwardly forming a top opening, swiveling said cover panel between a position closing said top opening and a position exposing said top opening, and forming and using releasable attachments along side edges of adjoining side panels for securing corners of said box cart;
    said releasable attachments comprising strips of interlocking, spaced nibs mounted on adjacent, adjoined edges of said side panels, said spaced nibs each comprising enlarged spherically shaped distal ends thereof, whereby said spaced nibs on said adjacent, adjoined edges of said side panels are interlockable for securing any contents;
    providing said releasable attachments being single columns of upwardly extending nibs intersecting with, and engaging with, respective single columns of upwardly extending interlocking spaced nibs of adjoined edges of said side and end panels at about ninety degrees from each other, said engagement of said nibs being engageable at orthogonal right angles; and
    using said box cart to store or move contents therein.

2. The method of claim 1 in which said metal frame assembly includes a braking system for locking and unlocking simultaneously all four casters.

3. The method of claim 2 further comprising the steps of providing that said brakes of the braking system are engaged by a brake foot pedal, which said brake foot pedal is pushed down into a latched position, providing both auditory and tactile feedback of having achieved a locked state, whereby said brakes are disengaged by a brake release pedal which unlatches said brake foot pedal, whereby said brake foot pedal rises, whereby further said engagement of said brake foot pedal engages four separate brake elements simultaneously on all four said casters, thereby keeping each said caster from rotating or swiveling.

4. The method of claim 3 wherein said braking system further comprises:
    a brake rod extending from a first housing to a second housing through a brake pedal assembly gear;
    said second housing containing a ring brake element;
    said first housing further having an additional ring brake element;

said first and second housings each having a pair of meshed bevel gears, extending the action of said brake rod synchronously to an extension rod and onward to a front brake rod;

said braking system having a pivotable rigid chassis responsive to a robust extension spring;

said rigid chassis being configured as a sector of an internal gear meshed with a pinion gear, which turns said brake rod;

said pinion gear being sized to turn 180 degrees over an excursion of said brake foot pedal over its rotation from an up position to a bottom latched position, whereby a rotary motion of said brake rod operates on two rear casters of said casters and is conveyed along a side via said extension rod through said meshed bevel gears in said first housing and said second housing and then onward through said front brake rod at the front through said front meshed bevel gears in said first housing to operate said front two double caster brakes.

5. The method of claim 4 further comprises each said caster having an arm and swivel ball bearing centered on a swivel axis, said brake system having a ring brake element, ring brake element being housed in a housing to restrict its movement to a vertical direction, an end of said operating brake rod being a semicircular cam and penetrating a side of said ring brake, whereby a compression spring exerts downward force atop said ring brake, forcing said ring brake down in contact with a top of said caster unless said cam is turned with its flat side downward within a hole to lift said cam out of contact and releasing the braking force.

6. The method of claim 1 further comprising the step of reducing a height of said cart from a first predetermined height to a lower second predetermined reduced height by providing an intermediate fold line allowing upper portions of said side panels to fold outwardly and down to form a cart of said reduced height.

7. The method of claim 6 further comprising the step of providing an additional fold line in said cover panel to form a pair of half panels to support said reduced height configuration of said side panels.

8. The method as in claim 1 further comprising the step of stacking a plurality of said box carts in either or both the assembled and folded configurations by placing an upper box cart over a lower box cart with the casters of the upper box cart dropping into the recesses in the lower box cart.

9. The method of claim 1 in which all of said panels are constructed of air-tight and water-tight rigid plastic material.

10. The method of claim 1 wherein said panels are folded within a perimeter confines of said metal frame assembly.

* * * * *